July 4, 1967 E. LEMKE 3,329,859

PINCUSHION CORRECTION CIRCUIT HAVING SATURABLE REACTOR AND MEANS FOR ADJUSTING THE PHASE AND MAGNITUDE OF THE HORIZONTAL COMPONENT

Filed Aug. 31, 1964

INVENTOR.
EUGENE LEMKE
BY
William H. Meagher
Attorney

United States Patent Office 3,329,859

Patented July 4, 1967

3,329,859

PINCUSHION CORRECTION CIRCUIT HAVING SATURABLE REACTOR AND MEANS FOR ADJUSTING THE PHASE AND MAGNITUDE OF THE HORIZONTAL COMPONENT

Eugene Lemke, Indianapolis, Ind., assignor to Radio Corporation of America, a corporation of Delaware Filed Aug. 31, 1964, Ser. No. 393,214
8 Claims. (Cl. 315—24)

Figure 1:
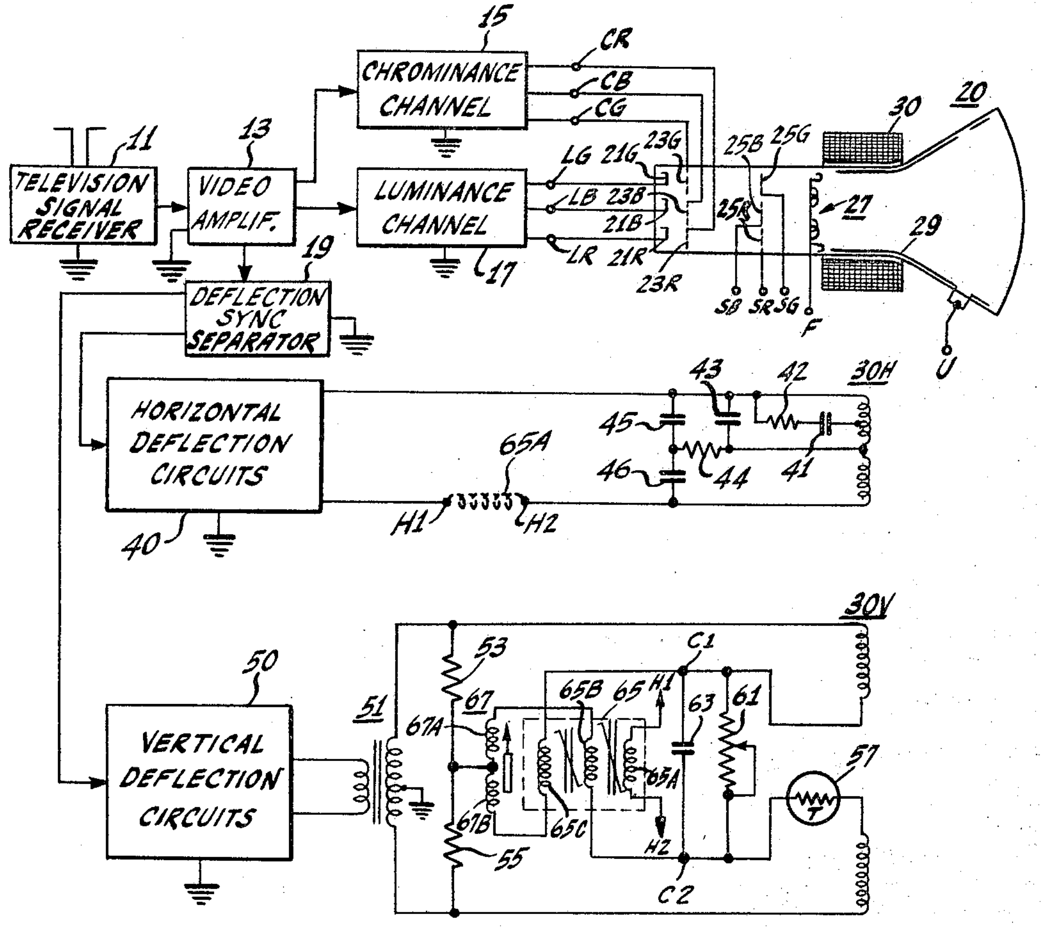

The present invention relates generally to cathode ray beam scanning systems and, particularly, to apparatus for use in such systems to correct scanning raster distortions.

The conventionally desired scanning raster for picture display in a television system comprises an array of straight, equal width scanning lines, disposed in a rectangular configuration. However, under various circumstances, conditions such as the geometry of the display device, and the design of the deflection yoke employed in raster development, may interfere with the attainment of the ideal raster configuration. One form of raster distortion which can be encountered is so-called "pincushion" distortion; "pincushion" distortion may manifest itself at the sides, and/or at the top and bottom of the display raster. The present invention is particularly concerned with correction of "top and bottom" pincushion distortion, as contrasted with "side" pincushion distortion.

A raster afflicted with "top and bottom" pincushion distortion will have top and bottom boundaries that depart from a desired straight edge form, bowing inwardly at the center of the raster. However, it is important to recognize that the distortion effect is not confined to the top and bottom edges of the raster. Rather, distortion extends throughout the raster. If the distortion is symmetrical, the effect may be described as downward central bowing of the successive scanning lines in the top half of the raster, with the degree of departure from the desired straight scanning line form being a maximum at the top, and lessening progressively to a minimum at the bottom of the top half of the raster; additionally, there is an upward central bowing of the scanning lines in the bottom half of the raster, with the degree of departure from the desired straight scanning line form being a maximum at the bottom and lessening progressively to a minimum at the top of the bottom half of the raster.

Color television receiver apparatus affords an example of equipment wherein top and bottom pincushion distortion may arise as a problem. The tri-gun, shadow-mask color kinescope has met with widespread acceptance as a satisfactory color image reproducing device for use in color television receivers. The RCA CTC–16 color television receiver, discussed in the RCA Service Data pamphlet designated 1964 No. T6, employs such a color image reproducing device; however, the deflection angle associated with the operation of this device in the CTC–16 receiver is relatively narrow (i.e., approximately 70°) compared to the relatively wide deflection angles (e.g., from 90° to 114°) employed in many monochrome television receivers. In the development of relatively wide-angle (e.g., 90°) tri-gun color kinescopes, the many stringent requirements imposed on the associated deflection yoke design have been found to necessitate yokes specifications that may result in pincushion distortion of the color kinescope scanning raster. The present invention is particularly concerned with the provision of correction circuits that may successfully overcome the top and bottom aspect of such pincushion distortion.

For examples of prior art solutions to the problem of pincushion raster distortion, attention is directed to U.S. Patent No. 2,649,555, issued to R. K. Lockhart on Aug. 18, 1953; to U.S. Patent No. 2,682,012, issued to R. K. Lockhart on June 22, 1954; to U.S. Patent 2,700,742, issued to A. W. Friend on Jan. 25, 1955, and to U.S. Patent 2,842,709, issued to P. M. Lufkin on July 8, 1958. In the above-mentioned Lockhart Patent 2,682,012, there is disclosed a particular solution to the top and bottom aspect of the pincushion distortion problem involving the use of auxiliary equipment including inter alia, a pair of electron discharge devices; the Lockhart circuitry develops a modulated line frequency component which is effectively added to the conventional field frequency scanning current wave in the vertical deflection winding of a deflection yoke. In the above-mentioned Lufkin patent, circuitry is disclosed for solving the side aspect of pincushion distortion, said circuitry involving use of a saturable reactor device; in the functioning of the Lufkin apparatus, the horizontal scanning current in the horizontal deflection winding of a deflection yoke is effectively modulated in amplitude by a field rate wave using the saturable reactor as a modulating device.

In a copending application of W. H. Barkow, Ser. No. 393,185, entitled "Raster Distortion Correction" and filed concurrently herewith, a novel and simplified approach to top and bottom pincushion correction is described. In the Barkow approach, considerable simplification of the correction circuitry (relative to that shown, for example, in the above-discussed Lockhart patent) is afforded through the use of saturable reactor apparatus to introduce the appropriately modulated horizontal frequency component into the vertical scanning current path. However, the saturable reactor apparatus of the Barkow application does not function as a modulator of the vertical scanning current in the sense of the Lufkin patent use of saturable reactor apparatus. Rather, the saturable reactor apparatus serves effectively as a transformer with a tuned secondary as a series element in the vertical scanning current path; the transformer effectively has two "competing" primary windings of oppositely poled coupling to the secondary. These primaries, energized by horizontal frequency waves, alternately prevail over each other to a variable degree, and in a manner determined by the vertical scanning current itself. The present invention is directed to improvements in top and bottom pincushion distortion correction circuits using the general approach of the aforesaid copending Barkow application.

In accordance with an embodiment of the present invention, the saturable reactor winding that serves effectively as a transformed secondary (as described above) is interposed between the respective halves of the vertical deflection winding of a deflection yoke so as to be traversed by the vertical scanning current. The secondary winding is, itself, effectively split in half, and a variable inductor is interposed between the respective halves so as to be traversed by the aforesaid vertical scanning current. The interposed variable inductor provides a highly advantageous adjusting means for effecting optimum pincushion correction results.

In accordance with a preferred form of the present invention, the midpoint of the variable inductor's winding is connected to a balance point in the vertical yoke circuit; respective halves of the variable inductor are wound together in bifilar fashion, while the respective halves of the transformer secondary winding are also wound together in bifilar fashion.

Through practice in accordance with the principles of the present invention, optimum tuning of the transformer secondary to achieve properly phased pincushion correction may readily be realized with minimized disturbance of other deflection and pincushion correction circuit parameters, enhanced correction energy transfer, and lowered vertical frequency power losses.

A primary object of the present invention is to provide a scanning system with novel apparatus for correcting scanning raster distortion.

A further object of the present invention is to provide novel and improved apparatus for correcting top and bottom pincushion distortion of a scanning raster.

Figure 1A:
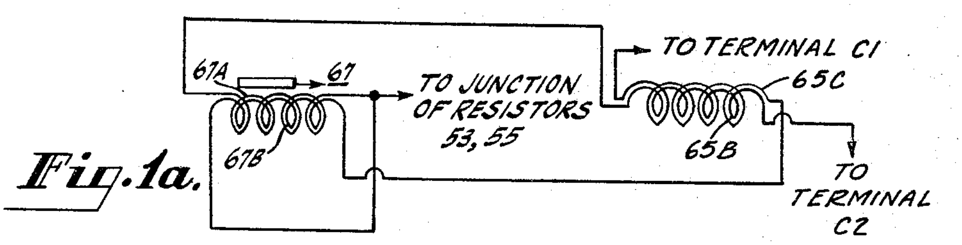

Other objects and advantages of the present invention will be readily recognized by those skilled in the art after a reading of the following detailed description and an inspection of the accompanying drawing in which:

FIGURE 1 illustrates, in partial block representation a color television receiver incorporating top and bottom pincushion correction circuitry in accordance with an embodiment of the present invention; and FIGURE 1*a* illustrates schematically a modification of the FIGURE 1 circuit in accordance with a preferred form of the present invention.

In the drawing, a color television receiver is illustrated, which may, for example, be of the general form of the aforementioned RCA CTC–16 color television receiver. Block representations of a number of major segments of the receiver are employed for the purpose of simplifying the drawing; however, pertinent portions of the receiver's deflection circuitry, together with pincushion correction circuitry in accordance with an embodiment of the present invention, are illustrated schematically.

The receiver input segment, represented by the block 11, labeled television signal receiver, selects a radiated color television signal, converts the selected modulated RF signal to intermediate frequencies, amplifies the resultant modulated IF signal, and, by detection of the IF signal, recovers a composite color video signal; i.e., it may comprise the usual lineup of tuner, IF amplifier and video detector. The composite color video signal output of receiver 11 is supplied to a video amplifier 13, from which is derived inputs for the receiver's chrominance channel 15, luminance channel 17, and deflection sync separator 19.

The chrominance channel 15, shown only in block form, may comprise the usual circuitry associated with proper recovery of color-difference signal information from the modulated color subcarrier which is a component of the composite color video signal output of video amplifier 13. Such circuitry generally comprises a bandpass amplifier for selectively amplifying the color subcarrier and its sidebands, a suitable array of synchronous detectors for demodulating the color subcarrier and matrix circuits for suitably combining the detector outputs to obtain a set of color difference signals of the appropriate form for application to the receiver's color image reproducer. To effect the desired synchronous detection of the color subcarrier, there will be associated with the chrominance channel detectors a local source of oscillations of subcarrier frequency and reference phase, as well as means for phase synchronizing this local oscillation source in accordance with the reference information of the burst component of the composite color video signal.

The red, blue and green color-difference signal outputs of the chrominance channel 15 appear at respective output terminals CR, CB and CG, which are directly connected to the respective control grids, 23R, 23B and 23G, of the red, blue and green electron guns of a color kinescope 20, which is of the tri-gun, shadow-mask type (and, illustratively, of the previously discussed wide-angle variety).

The color-difference signal drive of color kinescope 20 is complemented by the application of luminance information to the respective color kinescope cathodes 21R, 21B and 21G. Luminance channel 17, which may, in its usual form, comprise suitable wideband amplifier means for amplifying the luminance signal component of the composite color video signal processed by video amplifier 13, develops luminance signal outputs at respective output terminals LR, LB and LG for direct application to the respective kinescope cathodes 21R, 21B and 21G.

Desirably, the luminance channel 17 may include means for adjusting the relative amplitudes of the luminance signal outputs appearing at the respective output terminals, for color balance purposes.

The color kinescope 20 additionally includes: individual screen grid electrodes 25R, 25B and 25G for the respective red, blue and green electron guns, each screen grid electrode being supplied with an operating D.C. potential (desirably individually adjustable) at the appropriate one of the energizing terminals SR, SB and SG; focusing electrode structure 27 for the electron gun trio, subject to common energization via the output terminal F of an adjustable D.C. source (not shown) associated with the receiver's horizontal deflection circuits; and ultor (final accelerating) electrode structure 29, adapted to operate at a high voltage, supplied thereto via the output terminal U of a high voltage supply (not shown) also associated with the receiver's horizontal deflection circuits.

Associated witht the color kinescope 20 is a deflection yoke 30 for developing magnetic beam deflection fields within the kinescope to cause the kinescope beams to trace a scanning raster on the kinescope's viewing screen. The respective horizontal and vertical deflection windings of yoke 30 are illustrated schematically (with respective designations 30H and 30V) in association with their respective scan drive sources: the horizontal deflection circuits 40 and the vertical deflection circuits 50. The horizontal deflection circuits 40 respond to a horizontal sync pulse output of the deflection sync separator 19 to develop an output causing a line frequency scanning current (of essentially sawtooth waveshape) to traverse the horizontal deflection windings 30H. For the purpose of simplifying the drawing, the schematic details of the horizontal deflection circuits have not been illustrated; these circuits are represented by a block designated 40 with scanning scanning current conveying leads extending therefrom.

One half of the deflection winding 30H is shunted by a capacitor 43; the midpoint of deflection winding 30H is connected via resistor 44 to the junction of a pair of capacitors 45 and 46, connected in series across the winding 30H. These capacitive and resistive elements serve to eliminate or minimize so-called "ringing" effects, as explained more fully in U.S. Patent No. 2,869,030, issued to M. A. Deranian and B. V. Vonderschmitt on Jan. 13, 1959. For additional "ringing" correction purposes, a portion of the deflection winding half associated with capacitor shunted by the series combination of capacitor 41 and resistor 42.

As indicated in dotted lines, a winding 65A is connected (between respective terminals H1 and H2) as a series element in the horizontal scanning current path. Winding 65A is the control winding of saturable reactor apparatus 65 associated with the circuitry for energizing the vertical deflection winding 30V, and a full line showing of winding 65A appears at the appropriate location in that portion of the drawing showing the schematic details of apparatus 65 and associated vertical deflection circuitry, now to be described.

Vertical deflection circuits 50, suitably synchronized by a vertical sync pulse output of the deflection sync separator 19, constitute the source of a field frequency scanning current for the vertical deflection winding 30V of yoke 30, coupling to the yoke winding being effected via a vertical output transformer 51. As in the deflection yoke arrangement of the aforementioned CTC–16 receiver, a thermistor 57 is interposed between the respective halves of the vertical deflection winding 30V for temperature compensation purposes. However, pursuant to the pincushion correction purposes of the present invention, additional apparatus (having respective end terminals C1 and C2) appears in series with thermistor 57 in the connection between the respective halves of yoke winding 30V. One current path presented between terminals C1 and C2 consists of the series combination of windings 65C and 65B (respective segments of the output winding of the saturable reactor device 65) and a variable inductor 67, with the variable inductor 67 placed between the respective output windings segments in the series combination. Shunting this inductive current path is a capacitor 63 in parallel with a variable resistor 61 (the latter serving a correction amplitude adjustment purpose). The variable inductor 67 is provided with a center-tap, which is directly returned to the junction of a pair of equal-valued damping resistors 53 and 55, the latter being connected in series across the secondary winding of vertical output transformer 51.

Reference may be made to the aforementioned copending Barkow application for a detailed explanation of the functioning of the saturable reactor device 65 in effecting correction of pincushion distortion of the "top and bottom" type. For the purpose of understanding the present invention, however, it is believed that the following abbreviated explanation should suffice.

Illustratively, the reactor 65 comprises a two-window, three-leg core, with output winding segments 65B and 65C wound on the central core leg, and with respective halves of control winding 65A wound on respective different outside core leg (disposed parallel to said central core leg). The effective poling of the respective control winding halves is such that, though energized by the same horizontal scanning current, they tend to drive flux through the central core leg in mutually opposing directions. Thus, when their respective flux contributions are matched in amplitude there is complete flux cancellation of horizontal frequency flux variations in the central core leg, with the result that no horizontal frequency energy is transferred to the output winding segments 65B and 65C. However, should their respective flux contributions differ, cancellation in the central core leg will not take place, with the result that there is effective flux linkage between the output winding and one of the control winding halves; thus, horizontal frequency variations will be transferred to the output winding circuit by simple transformer action, the amplitude of the transferred variations depending upon the degree of difference in flux contributions, and the polarity depending upon which flux contribution is predominant.

In the illustrative circuit, dynamic control of the relative horizontal flux contributions is afforded by the vertical scanning current, itself, which flows through the output winding (65B, 65C) on the central core leg. During a first portion of the vertical scan cycle, when vertical scanning current is in a first direction (e.g., flowing from C1 to C2), it induces a flux that (1) opposes a bias flux in a core segment linking the central leg to one outside leg (thereby increasing the permeability of this core segment) and (2) adds to a bias flux in a core segment linking the central leg to the other outside leg (thereby lowering the permeability of this core segment). The reverse is true during a succeeding portion of the vertical scan cycle when the scanning reverses direction (e.g., flowing from C2 to C1).

Thus, horizontal frequency variations of one polarity are transferred to the output winding from one control winding segment with maximum amplitude at a first peak of vertical scanning current; maximum amplitude transfer in the opposite polarity occurs at the succeeding opposite direction peak of vertical scanning current. A polarity crossover occurs intermediate these peaks; a steady decrease in amplitude of the first polarity transfer occurs during approach of the crossover from the first peak, and a steady increase in amplitude of the opposite polarity transfer occurs subsequent to the crossover.

The modulated horizontal frequency component thus transferred to the output winding 65B, 65C is of the form appropriate to top and bottom pincushion correction, as discussed, for example, in the previously mentioned Lockhart Patent No. 2,682,012. So that a magnitude of this modulated horizontal frequency component sufficient for correction purposes may be caused to appear in the vertical deflection winding 30V, high Q means are provided for resonating the output winding 65B, 65C to the fundamental horizontal frequency. With such output winding tuning, a readily attainable level of control winding voltage will develop sufficient horizontal frequency voltage across the output winding to add the requisite horizontal frequency current component to the vertical scanning current in winding 30V. The horizontal frequency variations introduced will be essentially sinusoidal in shape, but it is observed that such a shape sufficiently approximates the ideal parabolic waveshape to effect an acceptable correction.

It might initially appear that the shunting of an appropriately valued tuning capacitor (such as capacitor 63 of the illustrated circuit) across the output winding 65B, 65C would suffice to effect the requisite tuning. However, practical tolerances on the capacitance value of capacitor 63 (e.g., ±10%) and inductance value of output winding 65B, 65C (e.g., ±20%) in mass production of receivers admit of off-resonance conditions that would seriously hinder correction. Accordingly, the present invention provides tuning adjustment means in the form of variable inductor 67 inserted between segments 65B and 65C of the output winding. Given sufficient range of inductance variation, variable inductor 67 ensures the ability (even under worst-case conditions) to tune the output winding to a resonance range providing adequate horizontal frequency energy transfer, and, moreover to tune the output winding within that range to properly phase the peaks of the horizontal frequency component in winding 30V relative to the actual line scanning intervals.

The present invention's use of variable inductor 67 permits provision of this tuning facility in a simple manner and with minor expense relative to other tuning methods. Through the central location of inductor 67, its center-tapping, and the returning of the center-tap to a balance point such as the damping resistor junction, the tuning facility is provided without disturbing the symmetry of the correcting energization of the deflection winding halves. With inductor 67 adjusted for efficient horizontal frequency energy transfer and proper phasing of the transferred horizontal frequency component, the magnitude of the correction effect may be controlled via adjustment of variable resistor 61 to alter the Q of the resonant output winding circuit.

In accordance with a preferred form of the present invention, as indicated in FIGURE 1*a*, the output winding segments 65B and 65C are bifilar wound, and, additionally, the winding halves of variable inductor 67 are also bifilar wound. This enhances the Q of the output winding circuit to strengthen the efficiency of horizontal frequency energy transfer, and lessens vertical frequency power losses in the apparatus interposed in the vertical scanning current path.

I claim:

1. In a cathode ray tube scanning system including a deflection yoke having respective horizontal and vertical deflection windings, said horizontal deflection winding being traversed by a line rate scanning current, and said vertical deflection winding being traversed by a field rate scanning current;

pincushion correction apparatus including the combination of:

a saturable reactor device comprising a control winding connected to said horizontal deflection winding so as to be traversed by said line rate scanning current, and having an output winding connected to said vertical deflection winding so as to be traversed by said field rate scanning current, said output winding having a pair of end terminals and including a pair of winding segments in series for said field rate scanning current;

and means for tuning said output winding including a capacitor connected across said pair of end terminals, and a variable inductor having a pair of end terminals, said variable inductor end terminals being connected to respective points on said pair of winding segments remote from said output winding end terminals in such manner as to serially interpose said variable inductor between said output winding segments in the path of said field rate scanning current.

2. In a cathode ray tube scanning system including a deflection yoke having respective horizontal and vertical deflection windings, said vertical deflection winding including a pair of winding halves, and respective sources of line rate and field rate scanning currents; the combination comprising:

a saturable reactor device including a control winding, and an output winding comprising two winding segments;

means for connecting said control winding in series with said horizontal deflection winding across said source of line rate scanning current;

a variable inductor;

means for connecting a series combination across said field rate scanning current source, said series combination including, in the order named, a first one of said pair of vertical deflection winding halves, a first one of said two output winding segments, said variable inductor, the remaining one of said two output winding segments, and the remaining one of said pair of vertical deflection winding halves.

3. In a cathode ray tube scanning system including a deflection yoke having a respective horizontal and vertical deflection windings, said vertical deflection winding including a pair of winding halves, and respective sources of line rate and field rate scanning currents; the combination comprising:

a saturable reactor device including a control winding, and an output winding comprising two winding segments;

means for connecting said control winding in series with said horizontal deflection winding across said source of line rate scanning current;

a variable inductor having a center-tap;

and means for connecting a series combination across said field rate scanning current source, said series combination including in series, in the order named, a first one of said pair of vertical deflection winding halves, a first one of said two output winding segments, said variable inductor, the remaining one of said two output windings segments, and the remaining one of said pair of vertical deflection winding halves;

and a pair of resistors of substantially equal resistance value connected in series across source of field rate scanning current, said variable inductor center-tap being connected to the junction of said pair of resistors.

4. In a color television receiver including a deflection yoke having respective horizontal and vertical deflection windings respectively energized by horizontal and vertical scanning currents to cause development of a scanning raster;

apparatus for correcting top and bottom pincushion distortion of said scanning raster comprising the combination of:

a saturable reactor device having a pair of output winding segments;

means for utilizing said saturable reactor device to add a modulated horizontal frequency component to the vertical scanning current energizing said vertical deflection winding, said means including means for causing said vertical scanning current to traverse said output winding segments serially;

means for adjusting the phasing of said horizontal frequency component, said phasing adjusting means comprising means for interposing a variable inductor between said output winding segments in the path of said vertical scanning current;

and means for adjusting the magnitude of said horizontal frequency component, said magnitude adjusting means comprising a variable resistor shunted across the series combination of said output winding segments and said interposed variable inductor.

5. In a color television receiver including a horizontal yoke winding traversed by horizontal scanning current, a source of vertical scanning current, and a vertical yoke winding segmented into respective halves; the combination comprising:

a saturable reactor device having a pair of output winding segments;

an additional inductor;

means for connecting a series combination across said source of vertical scanning current, said series combination including in series, in the order named, a first one of said halves of said vertical yoke winding, a first one of said pair of output winding segments, said additional inductor, the remaining one of said pair of output winding segments, and the remaining one of said halves of said vertical yoke winding;

means responsive to said horizontal scanning current for causing said saturable reactor device to introduce a modulated horizontal frequency component in said vertical yoke winding via said output winding segments;

and means for adjusting the phasing of said introduced horizontal frequency component comprising means for varying the inductance value of said additional inductor.

6. In a color television receiver including a horizontal yoke winding traversed by horizontal scanning current, a source of vertical scanning current, and a vertical yoke winding segmented into respective halves; the combination comprising:

a saturable reactor device having a pair of output winding segments;

an additional inductor;

means for connecting a series combination across said source of vertical scanning current, said series combination including in series, in the order named, a first one of said halves of said vertical yoke winding, a first one of said pair of output winding segments, said additional inductor, the remaining one of said pair of output winding segments, and the remaining one of said halves of said vertical yoke winding;

means responsive to said horizontal scanning current for causing said saturable reactor device to introduce a modulated horizontal frequency component in said vertical yoke winding via said output winding segments;

means for adjusting the phasing of said introduced horizontal frequency component comprising means for varying the inductance value of said additional inductor;

means for adjusting the magnitude of said introduced horizontal frequency component comprising a variable resistor shunted across a series combination of said output winding segments and said additional inductor;

a pair of resistors of substantially equal resistance value connected in series across said source of vertical scanning current;

and means for connecting the junction of said pair of resistors to the midpoint of said additional inductor.

7. Apparatus in accordance with claim 6 wherein said pair of output winding segments of said saturable reactor device are bifilar wound:

and wherein said additional inductor comprises a first winding portion extending from said midpoint to a first end terminal of said additional inductor and a second winding portion extending from said midpoint to a second end terminal of said additional inductor, said first and second winding portions of said additional inductor being bifilar wound.

8. Apparatus in accordance with claim 5 wherein said additional inductor comprises first and second winding portions connected in series relationship in said series combination, said first and second winding portions of said additional inductor being bifilar wound.

References Cited

UNITED STATES PATENTS

| | | | |
|---|---|---|---|
| 2,842,709 | 7/1958 | Lufkin | 315—24 |
| 2,906,919 | 9/1959 | Thor et al. | 315—24 |

JOHN W. CALDWELL, *Acting Primary Examiner.*

T. A. GALLAGHER, *Assistant Examiner.*